Figure 1:
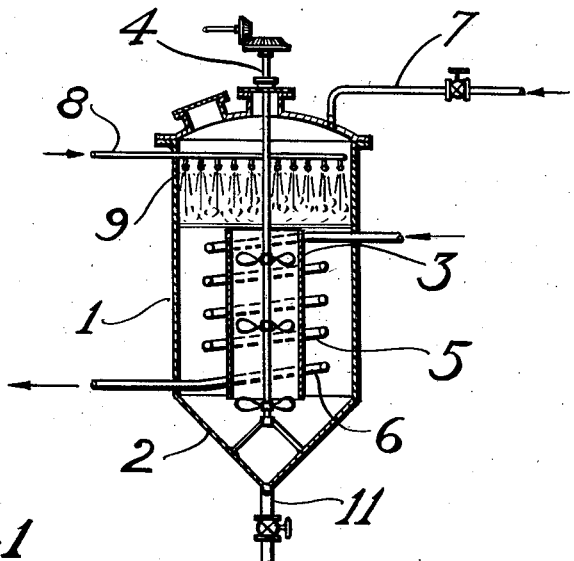

Feb. 7, 1933. K. T. STEIK 1,896,470

PROCESS FOR THE TREATMENT OF OIL

Filed July 18, 1928

Karl T. Steik Inventor

By Attorney

Patented Feb. 7, 1933

1,896,470

UNITED STATES PATENT OFFICE

KARL T. STEIK, OF ELIZABETH, NEW JERSEY, ASSIGNOR TO STANDARD OIL DEVELOPMENT COMPANY, A CORPORATION OF DELAWARE

PROCESS FOR THE TREATMENT OF OIL

Application filed July 18, 1928. Serial No. 293,584.

The present invention relates to the treatment of liquids with liquid treating agents, especially immiscible or slightly miscible with the liquid to be treated, and more particularly to an improved method for treating mineral and other oils with liquid treating agents such as sulfuric acid and the like. My invention will be understood from the following description and the drawing which illustrates means for accomplishing my method.

In the drawing, the figure is a semi-diagrammatic view in sectional elevation of a treating vessel which is constructed according to my invention.

In the treatment of liquids with immiscible treating agents, there have been many attempts to obtain thorough agitation. This is particularly advantageous when the agent has a deleterious local effect unless carefully dispersed through the material being treated; as for example, in the treatment of oils with sulfuric acid. I have found that the most thorough and efficient method is to atomize at least one of the liquids in a confined space and cause new surfaces of the other liquid to be exposed to the action of the atomized mist.

The present method is not to be confused with the well known methods of adding the acid to oils by drops or small streams or forcing streams of acid underneath the surface of the oil. It should also be distinguished from methods by which the acid is sprayed by air or steam and other gases. By the term "mechanical atomization," I mean atomization without the use of gases but only by mechanical pressure on the liquid.

Referring to the drawing, reference character 1, denotes a closed agitator or treating vessel which is provided with a conical bottom 2. A circulation pipe 3 is mounted vertically in the center of the agitator and suitable stirring means, such as a shaft 4, is fitted with propellers 5, which causes the liquid to rise through the central pipe 3 and descend in the annular space around the pipe. A suitable cooling means such as coil 6 is arranged in the vessel, preferably in the annular space and a cooling jacket (not shown) may be provided for the agitator. Pipe 7 is provided for addition of oil to the vessel and the acid or whatever treating liquid may be used, is forced under a considerable pressure through pipe 8 and is discharged from mechanical atomization nozzles 9 in a fine mist or spray. The liquid level in vessel 1 stands about so as to leave an ample space above which is occupied by the spray. Pipe 11 is provided for removal of sludge and oil from the vessel after treatment.

In the operation of my process, one of the liquids is mechanically atomized or sprayed onto a continually renewed or refreshed surface of the other liquid. I have found that small bore nozzles of resistant metals, such as chrome steel or any other suitable material, may be used for the spraying of the acid and that pressures of 20 to 60 pounds per square inch are generally sufficient to produce a mist of finely divided particles which is of great advantage in the treatment of oils. Cooling is desirable in most cases and it is especially advantageous to prevent rise of temperature if strong or fuming acid is used, or in any case where a considerable quantity of heat is evolved in the reaction.

As an example of my process when applied to the treatment of petroleum distillate to form white oils, I have found that 100% sulfuric acid or even weaker acid may be used in place of the fuming acid usually employed for this purpose which contains about 20% $SO_3$. The weaker acid if mechanically sprayed produces an oil equivalent to that resulting from the treatment with stronger acid when added by drops or small streams. By my process less acid is used and there is less loss of oil. In treatment of a white oil distillate, 5 successive treats of 100% acid, in total 25% of the volume of the oil, are necessary when the acid is added in small drops or streams to the agitated oil to produce a satisfactory product. By my method, an oil equally good in every respect was produced by only 3 treats of 100% acid, totaling 15% of the oil.

My method is applicable to the sulfonation of aromatic oils such as benzene, toluene and the like, or to the treatment of vegetable oils to produce sulfonated oils. Similarly it may be used for nitration of aromatic compounds, as will be readily understood, and is indeed applicable and useful wherever contact between liquids, particularly immiscible ones, is desired, and especially when failure to accomplish a proper dispersion of the treating agent produces inferior products.

My invention is not to be limited by any theory of the operation of my process nor by any example given merely by way of illustration but only by the following claims in which I wish to claim all novelty inherent in the invention.

I claim:

1. An improved process for the treatment of liquids with an immiscible liquid treating agent without contact with external air, comprising mechanically atomizing the heavier liquid in an enclosed space above the surface of the other liquid, and continually bringing fresh surfaces of the other liquid into contact in cyclic circulation with the atomized liquid.

2. An improved process for the treatment of liquids with an immiscible liquid treating agent without contact with external air, comprising mechanically atomizing the heavier liquid to form a mist in an enclosed space, agitating the other liquid within the enclosed space whereby a fresh surface is continually exposed in cyclic circulation to the mist, and separating the liquids after treatment.

3. An improved process for the treatment of oils with sulfuric acid, comprising mechanically spraying the acid to form a mist in an enclosed space, agitating the oil within the same space, whereby fresh surfaces of the oil are continually exposed to the finely divided acid.

4. An improved process for treating hydrocarbon oil with concentrated sulfuric acid, comprising atomizing the acid by forcing the same under pressure through a small orifice into an enclosed space, whereby the acid is finely divided in the form of a mist, and continually bringing new surface of oil in contact with the finely divided acid.

KARL T. STEIK.